United States Patent
Foxcroft et al.

[11] Patent Number: 5,105,734
[45] Date of Patent: Apr. 21, 1992

[54] PEELER

[75] Inventors: Geoffrey Foxcroft, 40 Sapphire Street, Niddrie, Victoria 3042; Cliff R. Mansfield, Mainridge, both of Australia

[73] Assignee: Geoffrey Foxcroft, Victoria, Australia

[21] Appl. No.: 679,046

[22] PCT Filed: Nov. 1, 1989

[86] PCT No.: PCT/AU89/00469
§ 371 Date: May 8, 1991
§ 102(e) Date: May 8, 1991

[87] PCT Pub. No.: WO90/04929
PCT Pub. Date: May 17, 1990

[30] Foreign Application Priority Data

Nov. 8, 1988 [AU] Australia ............... PJ1363
May 18, 1989 [AU] Australia ............... PJ4265

[51] Int. Cl.⁵ .................... A23N 7/00; A23N 7/02
[52] U.S. Cl. .................................. 99/541; 99/545; 99/546; 99/588; 99/592
[58] Field of Search ................. 99/537, 539–543, 99/544–546, 547, 550, 584, 588, 589, 591, 592–594, 636; 426/481, 482

[56] References Cited

U.S. PATENT DOCUMENTS

| | | | |
|---|---|---|---|
| 1,920,095 | 7/1933 | McCall | 99/542 |
| 2,856,097 | 10/1958 | McFaull, Jr. | 99/544 |
| 3,780,641 | 12/1973 | Hole | 426/482 |
| 3,874,280 | 4/1975 | Vadas | 99/544 |
| 4,108,060 | 8/1978 | Loveland | 99/591 |
| 4,373,432 | 2/1983 | Tsutsumi | 99/546 |
| 4,441,413 | 4/1984 | Mori | 99/593 |
| 4,606,263 | 8/1986 | Ross et al. | 99/544 |
| 4,653,393 | 3/1987 | Ross | 99/544 |
| 4,718,333 | 1/1988 | Pierce et al. | 99/589 |
| 4,834,795 | 5/1989 | Raub et al. | 99/542 |

FOREIGN PATENT DOCUMENTS 1569019 6/1980 United Kingdom .......... 99/544

Primary Examiner—Timothy F. Simone
Attorney, Agent, or Firm—Larson and Taylor

[57] ABSTRACT

A peeler (10) is provided for peeling articles (50) such as oranges. The peeler (10) comprises a cylindrical member (12) which will cut a major portion of the article (50) by plunging thereinto. The portion cut will be within the cutting member (12) with the peel on the outside of the cutting member (12). A moveable member (20) is provided to push the portion from within the cutting member (12). A peel removing member (18) is provided to remove the peel from the outside of the cutting member (12). The ends of the portion can have the peel removed therefrom by slicing menas (149) either before or after the portion is cut from the article.

17 Claims, 6 Drawing Sheets

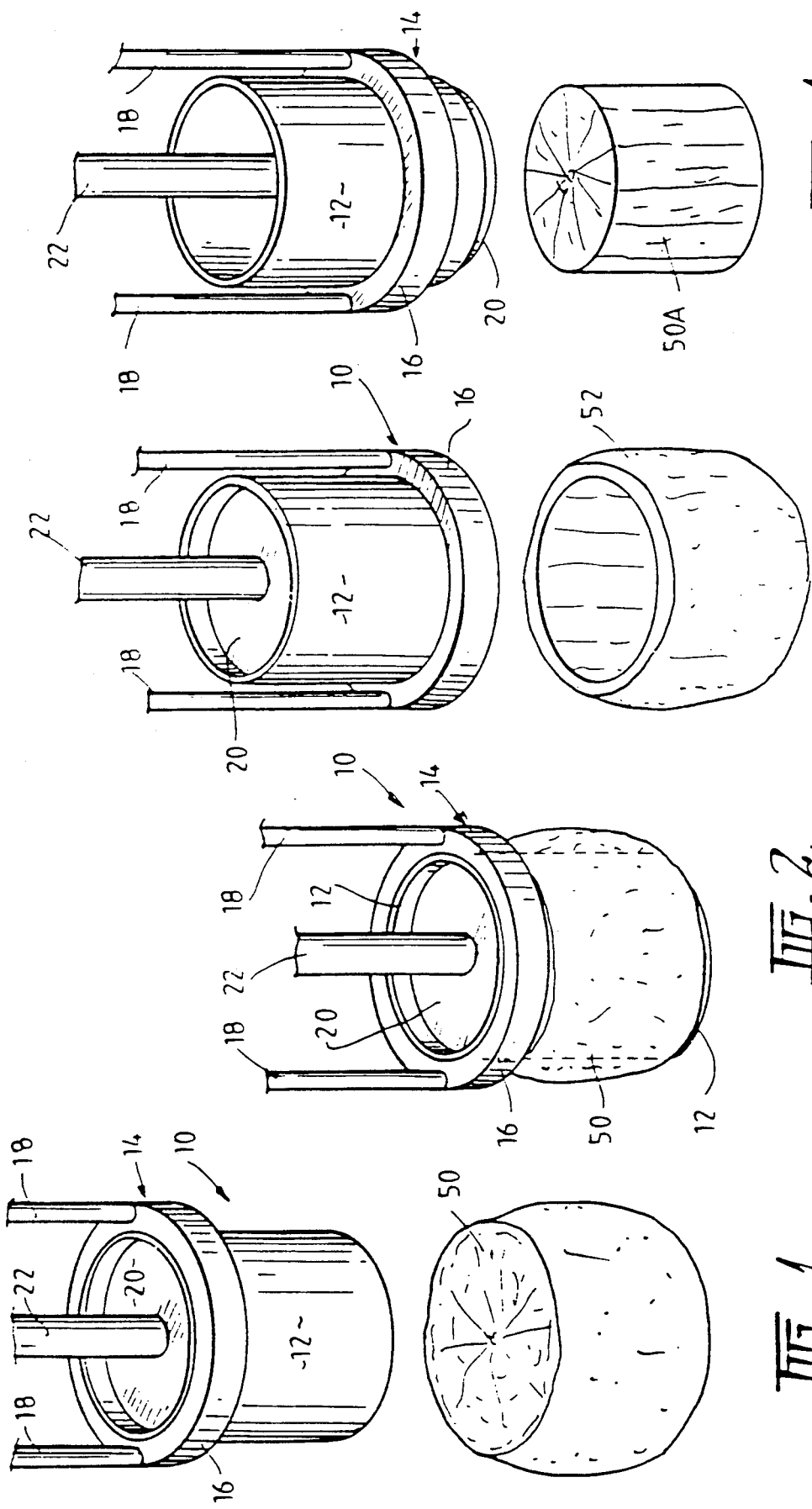

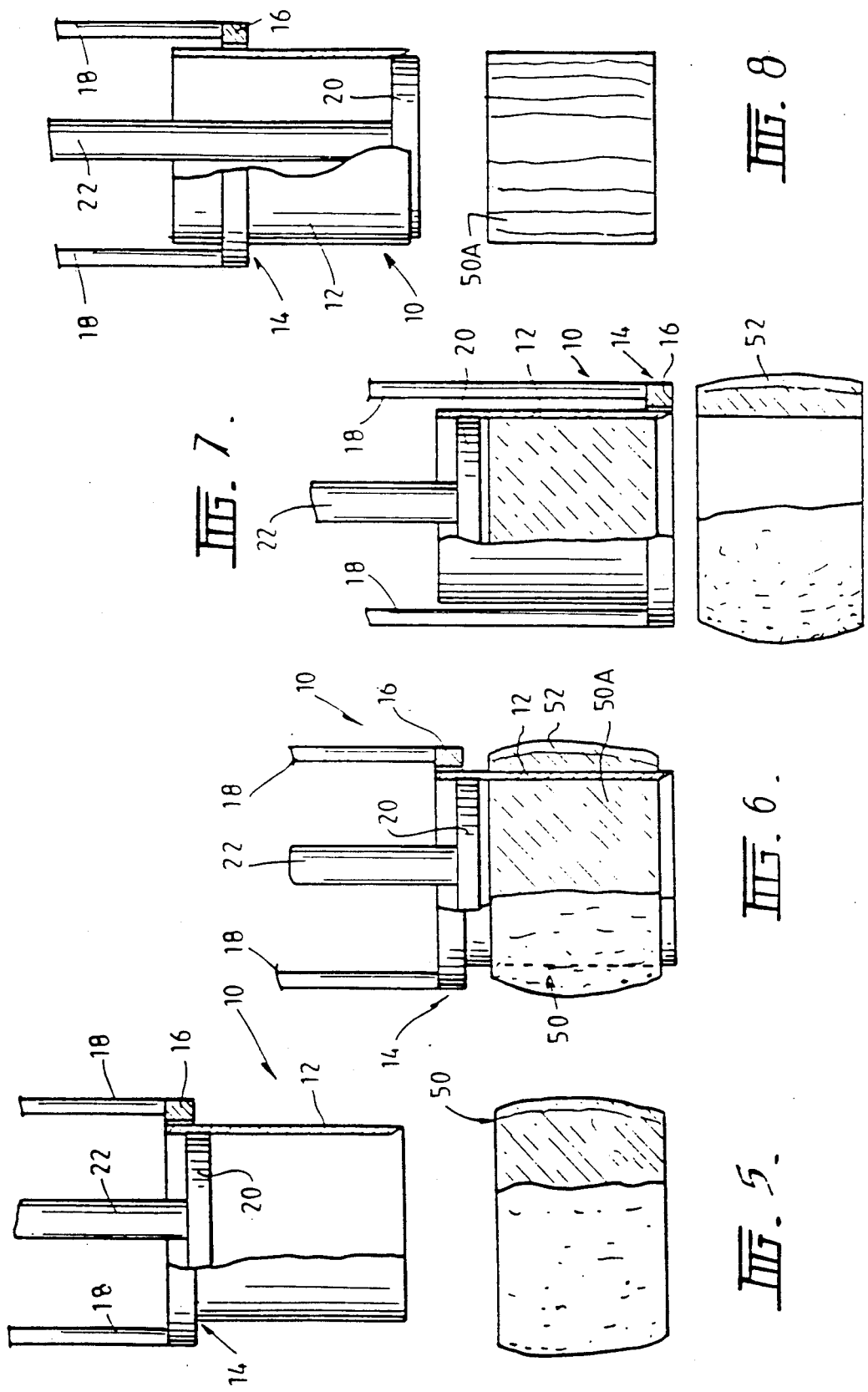

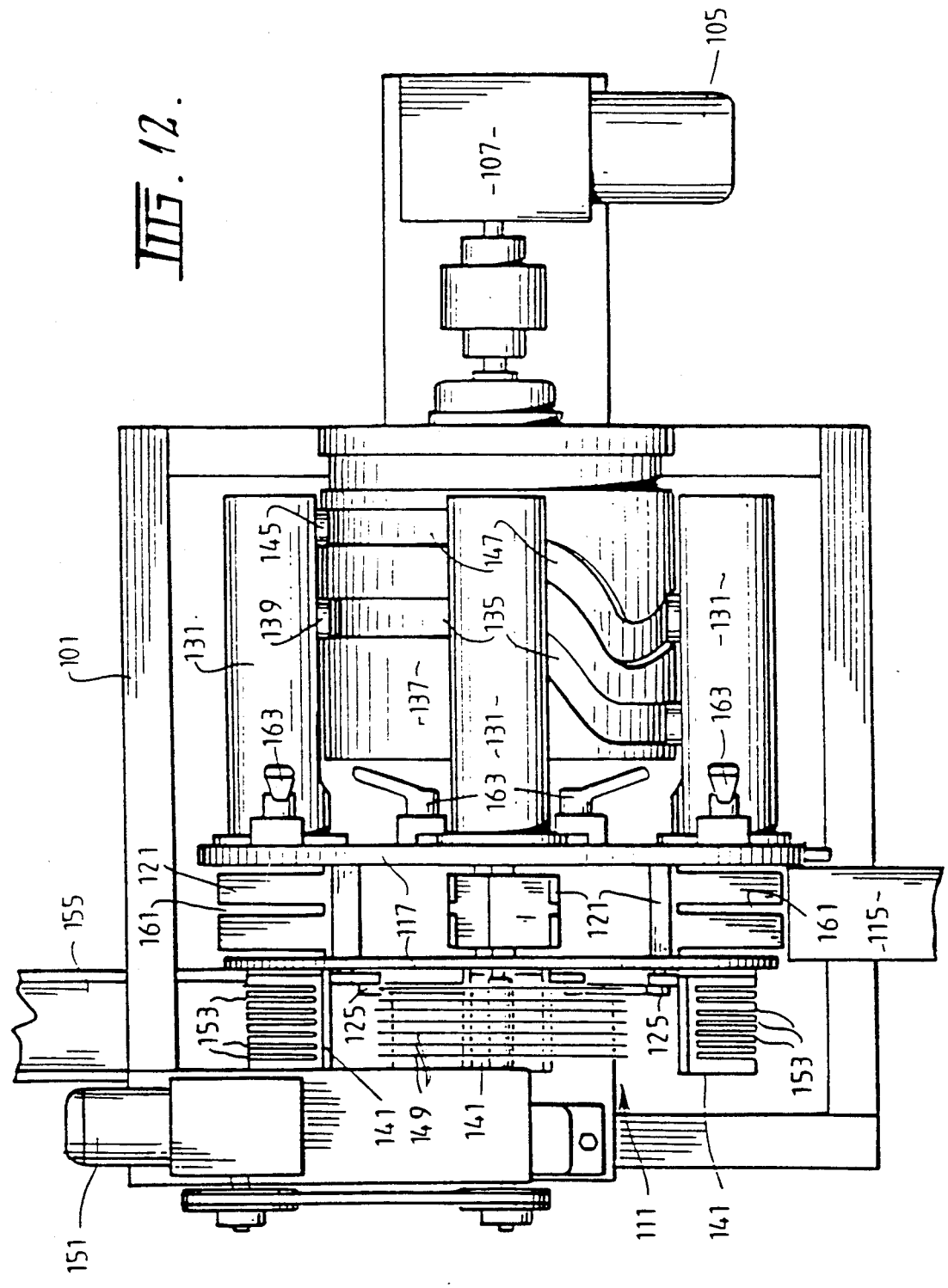

PEELER

FIELD OF THE INVENTION

This invention relates to a peeler and relates particularly, but not exclusively, to a peeler for citrus fruit such as oranges.

DESCRIPTION OF PRIOR ART

Hitherto citrus fruits such as oranges have been peeled in commercial quantities either manually or by a rotating disc cutter which described a helix cut to the skin so a skin removing member can pass under the skin and remove the skin as an elongate spiral. The above are laborious or time consuming. Both are expensive.

OBJECT AND STATEMENT OF THE INVENTION

The present invention attempts to overcome the aforementioned problems.

The invention may be said to reside in a peeler comprising a cutting member, a movable member arranged for relative movement into said cutting member and a peel removing member, wherein said cutting member is adapted to cut into an article to be peeled so that at least a portion of said article is received within said cutting member with the peel surrounding the cutting member, said peel removing member is adapted to move relative to said cutting member to push the peel away from the cutting member and said movable member being movable relative to said cutting member into said cutting member so that said portion of the article can be pushed out of said cutting member.

Preferably said cutting member comprises a cylinder and said movable member comprises a plunger arranged within a top portion of said cylinder and movable relative to said cylinder so as to push said portion of the article out of said cylinder after it is cut.

Preferably said peel removing member comprises a ring member which surrounds the cutting cylinder and is movable relative to the cutting cylinder so as to push the peel away from the cutting cylinder.

BRIEF DESCRIPTION OF DRAWINGS

Examples of preferred embodiments of the invention will be described with reference to the accompanying drawings, in which: FIG. 1 is a schematic perspective view of a first embodiment of a peeler embodying the invention;

FIG. 2 is a view of the peeler of FIG. 1 in a second position;

FIG. 3 is a view of the peeler of FIG. 1 in a third position;

FIG. 4 is a view of the peeler of FIG. 1 in a fourth position;

FIGS. 5 to 8 are cross-sectional views of the peeler which correspond to FIGS. 1 to 4 respectively;

FIG. 12 is a plan view of the peeler shown in FIG. 9.

DETAILED DESCRIPTION OF PREFERRED EMBODIMENTS

Figure 9:
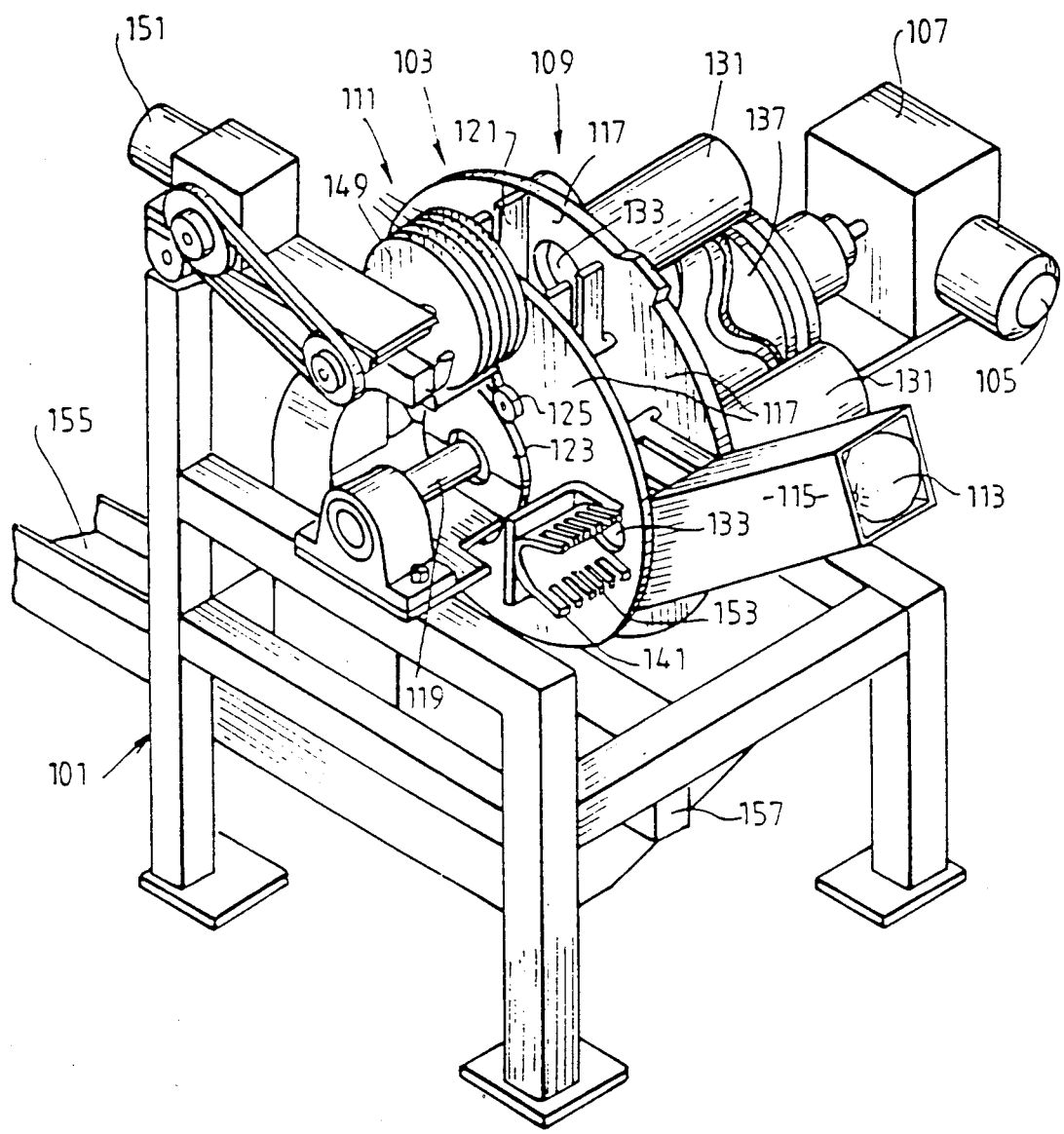
FIG. 9 is an isometric view of a second embodiment of a peeler embodying the invention.

With reference to FIGS. 1 to 8 of the drawings, the peeler 10 comprises a cylindrical cutting member 12, a peel removing member 14 which comprises a ring 16 which surrounds the cutting cylinder 12 and a pair of upright members 18 connected to the ring 16 for moving said ring 16 relative to said cylinder 12.

In alternative embodiments it would be possible for the peel removing member 14 to comprise a cylinder which is larger than the cylinder 12 and which surrounds the cylinder 12 instead of merely comprising a ring 16 with uprights 18.

A plunger 20 is arranged within the top portion of the cutting cylinder 12 and has a stem 22 for moving said plunger 20 within the cylinder 12.

Before an article, such as an orange 50, is peeled it is preferred in this embodiment that the top and bottom of the orange be sliced from the orange as is shown in FIGS. 1 and 5 by suitable peel removing means. In order to peel the orange the entire assembly shown in FIGS. 1 and 5 is moved relative to the orange so that the cutting cylinder 12 cuts into the orange so that the major portion of the orange is contained within the cutting cylinder 12. The skin and possibly some of the outermost portion of the orange adjacent the peel is therefore left outside the cutting cylinder 12 and surrounds the cutting cylinder 12 as is shown in FIGS. 2 and 6.

In order to remove the peel 12, the peel remover 14 is actuated, as shown in FIGS. 3 and 7, so that the ring 16 moves downwardly relative to the cylinder 12 so that the skin 52 is pushed off the cylinder 12. Actuation of the peeler 14 can take place by a suitable mechanism which is coupled to the uprights 18.

In order to remove the peeled orange from the peeler, the plunger 20 is moved downwardly within the cylinder 12 relative to the cylinder 12 so that the portion 50A of the orange contained within the cylinder 12 is pushed out of the cylinder 12 as is best shown in FIGS. 4 and 8. The plunger 20 may be moved by a suitable mechanism coupled to the stem 22.

The peeled orange may then be further processed such as by cutting the orange into slices and freezing the slices so that the orange may be transported or offered as a delicacy.

In the preferred embodiment of the invention a machine is proposed which will include a number of the peelers shown in the drawings. The oranges can be cut by a suitable cutting device to remove the top and bottom surfaces and then conveyed to the machine on a conveyor belt. The machine may be indexed so that when the oranges are located beneath the peelers, the peelers are operated to peel a number of oranges in a single cycle of the machine.

FIGS. 9 through 12 show a second embodiment comprising a frame 101 which carries a peeling and slicing mechanism shown generally by numeral 103. The mechanism 103 is driven from a motor 105 through a right-angled gear box 107. The peeling and slicing mechanism comprises two separate parts. The first part comprises a peeling mechanism 109 and the second part comprises a slicing mechanism 111 forming a peel removing means. Articles 113 to be peeled such as oranges and/or grapefruit or other similar articles 113 are supplied to the peeling mechanism 109 through an inclined chute 115. The articles 113 can be fed to the chute 115 through a suitable hopper means (not shown).

The peeling mechanism 109 includes two spaced apart discs 117 which are mounted in spaced relation along an axle 119. The spacing apart of the discs 117 is approximately equal to the diameter of the largest article to be peeled, i.e. the diameter of the largest expected orange or other product which is to peeled. The spaced apart discs 117 carry U-shaped article holding means 121. The article holding means 121 are spaced with the open end towards the radially outermost edges of the discs 117. The holding means 121 are spaced 90° from each other around the discs 117. Accordingly, there are four holding means 121 provided between the discs 117. The discs 117 are, in turn, attached to the axle 119 and are rotated in an anti-clockwise direction when viewing FIG. 9. Thus, articles 113 can be delivered into the article holding means 121 as the discs 117 rotate to a position at the bottom end of the chute 115. This, in turn, allows the articles 113, such as oranges, to transfer one at a time into each of the article holding means 121.

Figure 11:
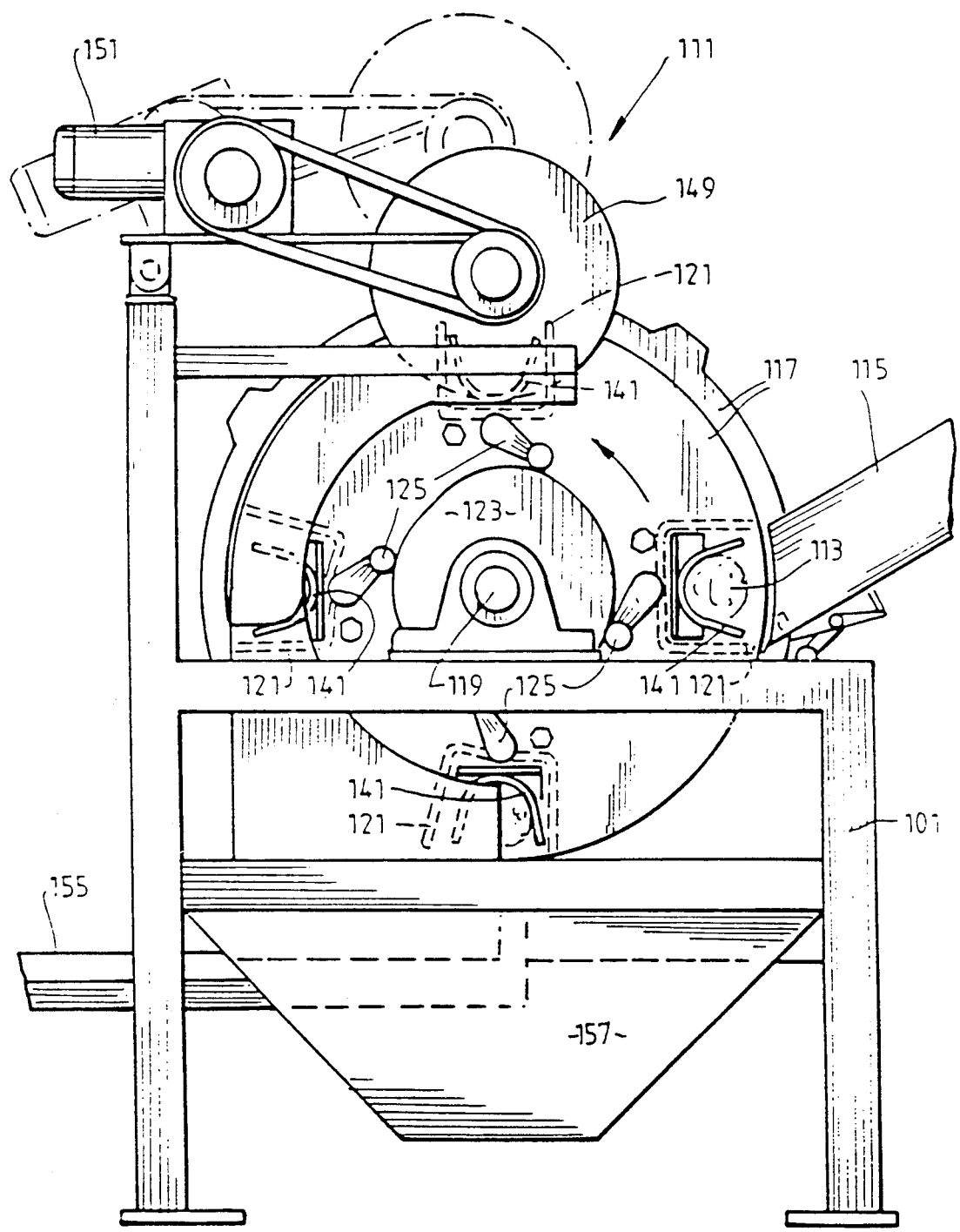
FIG. 11 is an end elevation of the peeler shown in FIG. 9.

The arms of the U-shaped article holding means 121 are mounted for swinging movement so that as an article 113 such as an orange is received therein, the arms can swing to clampingly engage with the article 113. This is not clearly shown in the drawings, but FIG. 11 shows the nature of the swinging. This is shown by the dotted lines in relation to the U-shaped article holding means 121. FIG. 11 shows a cam member 123 which is situated at the outermost face of the outermost disc 117. The cam member 123 is not attached to the disc 117 or to the axle 119 but is held stationary. Each of the U-shaped article holding means 121 has a cam follower lever arm 125 attached thereto so that as the discs 117 rotate—i.e. the peeling mechanism 109 rotates—the cam follower lever arms 125 track the cam surface 123. This, in turn, causes the U-shaped article holding means 121 to swing to close against the article 113. It also allows the U-shaped article holding means 121 to be opened somewhat to allow for discharge. It can be seen by inspecting FIG. 11 that the direction of rotation of the peeling mechanism 109 is anticlockwise and that the U-shaped article holding means 121 at the 9:00 o'clock and 6:00 o'clock positions have opened relative to the U-shaped article holding means 121 at the 3:00 o'clock and 12 o'clock positions.

In order to effect peeling of the articles 113, the discs 117 carry cutting means in the form of cutting cylinders 127 (see FIG. 10) which are carried within cylindrical casings 131 attached to the innermost disc 117. The cutting cylinder 127 is of a diameter equal to that which is required of the article. In other words the cutting cylinders 127 are used for plunging sideways through the discs 117 to cut a cylindrical portion from the articles 113. The diameter of the cutting cylinders 127 is therefore chosen appropriately to provide the maximum effective diameter of cut whilst allowing the peel to be removed during the plunging operation of the cutting cylinders 127. It can be seen in FIG. 9 that each of the discs 117 has aligned openings 133 at the position of each of the U-shaped article holding means 121. The cutting cylinders 127 are caused to be displaced sideways to penetrate the article 113 by means of a guiding cam track 135 arranged on a cylindrical cam 137 which is mounted stationary relative to the axle 119. The cutting cylinders 127 connect with a finger 139 which locates in the guiding cam track 135. Thus, after an article 113 has been received in the U-shaped article holding means 121 and clamped by the arms thereof, as the discs 117 rotate the respective cutting cylinder 127 is then caused to be displaced sideways to penetrate the article 113 and cut a cylindrical portion therefrom. The article 113 is inhibited from being displaced sideways by locating against the inner wall face of the outermost disc 117. Thus, the required portion of the article 113 is received within the respective cutting cylinder 127, whilst the unwanted peel portion remains external of the cutting cylinders 127.

When the article 113 is peeled in this manner it will be appreciated that each of its side surfaces adjacent the respective discs 117 will still have a portion of the peel remaining.

Figure 10:
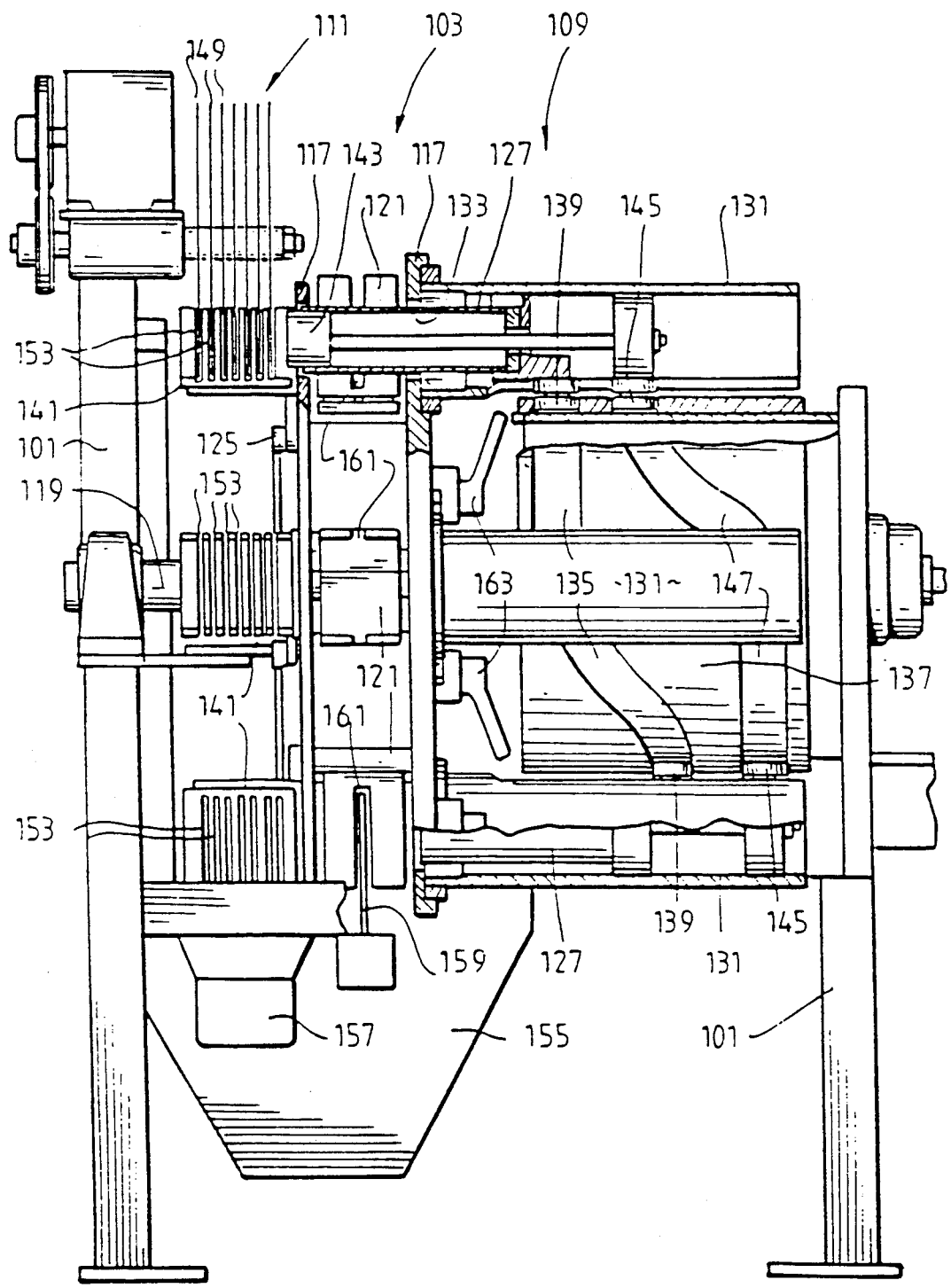
FIG. 10 is a side elevational view of the peeler shown in FIG. 9.

The remaining peel on the wanted portion of the article 113 is then removed by the peel removing means in the form of the slicing mechanism 111. In order to allow the slicing mechanism 111 to slice the remaining end portions of the peel from the wanted portion of the articlee 113, the wanted portion of the article 113 within the cutting cylinders 127 is pushed through the opening 133 in the outermost disc 117 into U-shaped holding means 141. This occurs when the discs 117 are approximately at the 2:00 o'clock position during rotation of the discs 117. In order to effect such transfer into the U-shaped holding means 141 there is provided a moveable member in the form of a pushing plunger 143 in each of the cutting cylinders 127 (FIG. 10 clearly shows the arrangement). The pushing plunger 143 carries a finger 145 which locates in a second guiding cam track 147 on the cam cylinder 137. Each of the cutting cylinders 127 and the pushing plungers 143 can be suitably journalled within the cylindrical casing 131 to permit for free sliding movement into the extending and retracted positions relative to the casings 131. The relevant disc 117 performs the function of the peel removing member during this transfer.

The slicing mechanism 111 may comprise only two slicing discs for cutting the respective peel off the respective ends of the portion of the article which is to be peeled. In the embodiment shown herein, the slicing mechanism comprises a series of slicing discs for simultaneously cutting the article into disc-like portions. The slicing mechanism 111 comprises the cutting discs 149 which are driven by a motor 151. The slicing mechanism 111 can be swung upward and downwardly relative to the motor 151 as diagrammatically shown in FIG. 11. This swinging is to permit ease of cleaning of the machine. In normal use, the slicing mechanism 11 is mounted in the full-line position shown in FIG. 11. It can be seen that the U-shaped holding means 141 have a series of slits 153 therein. Each of the slicing discs 149 is aligned so that it will pass cleanly through the slits 153. In this manner the article can be cut into disc-like portions as the discs 117 rotate past the cutting discs 149.

As the sliced and peeled articles 113 move from the 9:00 o'clock position towards the 6:00 o'clock position, they fall from the U-shaped holding means 141 onto a conveyor 155 to be transferred to a suitable location. The ends of the cylindrical cut portions of the article 113 are deflected by fingers (not shown) so that they fall into a peel hopper 157. Finger means 159 (see FIG. 10) are provided at the 6:00 o'clock position of the discs 117 to pass through slots 161 in each of the U-shaped holding means 121 to remove the peel portion of the article 113 which may remain in the U-shaped article holding means 121. This clears the U-shaped holding means 121 for receiving a fresh article 113 when that U-shaped article holding means 121 is at the bottom of the chute 115.

Oranges, for example, which may be a convenient article 113 to be peeled by the apparatus are usually graded into various sizes. Thus, the diameter of the cutting cylinders 127 will have to be of different diameters for different size grades of oranges. Accordingly, the cylindrical casing 131 together with the cutting cylinders 127 and pushing plungers 143 are removable from the innermost disc 117 by means of quick release means having quick release levers 163. Thus, an appropriate sized cylindrical casing 131, cutting cylinder 127 and pushing plungers 143 can be placed on the innermost disc 117.

Since modification within the spirit and scope of the invention may readily be effected by persons skilled within the art, it is to be understood that this invention is not limited to the particular embodiments described by way of example hereinabove.

I claim:

1. A peeler comprising a cutting member, a movable member arranged for relative movement into said cutting member and a peel removing member, wherein said cutting member is adapted to cut into an article to be peeled so that at least a portion of said article is received within said cutting member with the peel surrounding the cutting member, said peel removing member is adapted to move relative to said cutting member to push the peel away from the cutting member and said movable member being movable relative to said cutting member into said cutting member so that said portion of the article can be pushed out of said cutting member, said cutting member comprising a cylinder and said movable member comprising a plunger arranged to relatively move within a portion of said cylinder to push said portion of the article out of said cylinder after it is cut, and wherein there is provided a pair of discs axially mounted on an axle in spaced apart relation, the spacing being sufficient to allow an article to be peeled to be placed therebetween, article holding means between the discs for supporting the article to be peeled relative to the pair of discs, openings in said pair of discs angularly aligned with each other at the position of said article holding means, said cutting member and said movable member being alignable with said openings, the opening in one of said pair of discs being of a size sufficient to allow both said cutting member and said movable member to pass therethrough, and the opening in the other of said pair of discs being of size to allow the portion of said article to pass therethrough, said pair of discs being axially rotatable with said axle so that when an article is received in said article holding means, said cutting member can extend to pass through the opening in said one of said pairs of discs so said portion will be within said cutting member and said movable member can then extend to pass through said opening to push said portion through the opening in the other of said pairs of discs.

2. A peeler as claimed in claim 1 wherein said peel removing member comprises a ring member which surrounds the cutting cylinder and is movable relative to the cutting cylinder so as to push the peel away from the cutting cylinder.

3. A peeler as claimed in claim 1 wherein there is also provided peel removing means for removing the peel from the ends of said portion of the article.

4. A peeler as claimed in claim 1 wherein said cutting member and said movable member are mounted to said one of said pairs of discs so they rotate with said pairs of discs and wherein said cutting member and said movable member are connected with cam means to effect extension and retraction relative to said pairs of discs so said portion can be cut and received within said cutting member and so said portion can be pushed from said cutting member as the pair of discs rotate and so said cutting member and said movable member can be retracted to allow removal of peel cut from said article and to allow the introduction of another article to said holding means.

5. A peeler as claimed in claim 4 wherein said cam means is mounted co-axially of said axle so that as said pair of discs rotate there will be relative angular movement relative to said cam means whereby said cutting member and said movable member can be extended and retracted.

6. A peeler as claimed in claim 5 wherein there are two cam tracks forming part of said cam means, one track being for a cam follower which connects with said cutting member and the other track being for a cam follower which connects with said pushing member.

7. A peeler as claimed in claim 6 wherein there are a plurality of angularly spaced cutting members and related movable members mounted relative to said pair of spaced discs, each similarly adapted, in turn, to effect peeling of a respective article as said pair of spaced discs is rotated.

8. A peeler as claimed in claim 7 wherein said holding means is movable to clampingly engage with an article during peeling.

9. A peeler as claimed in claim 8 wherein said holding means comprises a pair of swinging arms which can swing to open and close the holding means to release and to hold an article therein, and further cam means to effect such opening and closing as said pair of discs rotate.

10. A peeler as claimed in claim 7 wherein there is provided further article holding means for holding said portion of said article pushed through the opening in said other of said pair of discs and wherein there is provided peel removing means for removing peel from each end of the portion pushed into said further holding means as said pair of discs is rotated therepast.

11. A peeler as claimed in claim 10 wherein said peel removing means comprises cutting discs which are axially rotated to effect such cutting.

12. A peeler as claimed in claim 11 wherein there are a series of such cutting discs mounted in spaced apart relation on a common axle and wherein said portion will also be sliced into discs as said pair of discs is rotated therepast.

13. A peeler as claimed in claim 10 wherein said peel removing means is mounted to swing from a cutting position to permit ease of cleaning of said peeler.

14. A peeler as claimed in claim 11 wherein there is provided article delivery means for delivering an article to said holding means as said holding means rotates therepast.

15. A peeler as claimed in claim 11 including a discharge conveyor for receiving peeled articles as they are discharged from said further holding means as said further moulding means rotates therepast.

16. A peeler as claimed in claim 11 including peel receiving means for receiving peel cut from said article as said pair of discs is rotated.

17. A peeler as claimed in claim 7 wherein said cutting members and said movable members are attached to said pair of discs by quick release means so they can be changed to different sizes to effect efficient peeling of different sized articles.

* * * * *